(12) United States Patent
Tada et al.

(10) Patent No.: US 7,733,597 B2
(45) Date of Patent: Jun. 8, 2010

(54) MAGNETIC TAPE CARTRIDGE

(75) Inventors: Nobuyuki Tada, Kanagawa (JP); Nobuaki Higashi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 890 days.

(21) Appl. No.: 11/475,130

(22) Filed: Jun. 27, 2006

(65) Prior Publication Data

US 2007/0058290 A1 Mar. 15, 2007

(30) Foreign Application Priority Data

Jun. 27, 2005 (JP) ............................. 2005-186766

(51) Int. Cl.
*G11B 23/30* (2006.01)
(52) U.S. Cl. ........................................................ 360/92
(58) Field of Classification Search ................ None
See application file for complete search history.

(56) References Cited

U.S. PATENT DOCUMENTS

| | | | |
|---|---|---|---|
| 5,218,342 A * | 6/1993 | McCrackin | 340/572.8 |
| 6,299,088 B1 * | 10/2001 | Rambosek | 242/347 |
| 6,304,416 B1 * | 10/2001 | McAllister et al. | 360/132 |
| 6,481,658 B1 * | 11/2002 | Shiga et al. | 242/347 |
| 6,577,471 B1 * | 6/2003 | Morita et al. | 360/132 |
| 7,064,926 B2 * | 6/2006 | Kitamura et al. | 360/132 |
| 7,227,721 B1 * | 6/2007 | Kientz et al. | 360/132 |
| 2003/0002214 A1 * | 1/2003 | Kitamura et al. | 360/132 |
| 2003/0058086 A1 | 3/2003 | Hara | |
| 2003/0089809 A1 * | 5/2003 | Maekawa et al. | 242/332.4 |

FOREIGN PATENT DOCUMENTS

| | | |
|---|---|---|
| JP | 10098514 A | 4/1998 |
| JP | 2001237626 A | 8/2001 |
| JP | 2002-083482 A | 3/2002 |
| JP | 2002-140879 A | 5/2002 |
| JP | 2004-127349 A | 4/2004 |
| JP | 2004-171243 A | 6/2004 |

OTHER PUBLICATIONS

Japanese Office Action corresponding to Japanese Patent Application No. 2005-186766 dated Oct. 30, 2009.

* cited by examiner

*Primary Examiner*—Mark Blouin
(74) *Attorney, Agent, or Firm*—Sughrue Mion, PLLC (57) ABSTRACT

A magnetic tape cartridge is provided including a case which is formed by an upper half and a lower half which are combined together, a reel to which a magnetic tape is wound, being rotatably contained in the case, a labeling side which is provided in an outer surface of the case, and a security tag which an external detector can detect, in which the security tag is arranged behind the labeling side so as to face obliquely upward.

18 Claims, 6 Drawing Sheets

MAGNETIC TAPE CARTRIDGE

CROSS REFERENCE TO RELATED APPLICATIONS

This application claims the foreign priority benefit under Title 35, United States Code, §119(a)-(d) of Japanese Patent Application No. 2005-186766, filed on Jun. 27, 2005 in the Japan Patent Office, the disclosure of which is herein incorporated by reference in its entirety.

BACKGROUND OF THE INVENTION

1. Field of the Invention

The present invention relates to a magnetic tape cartridge, and more specifically, to a magnetic tape cartridge which a detector can surely detect.

2. Description of the Related Art

Figure 6:
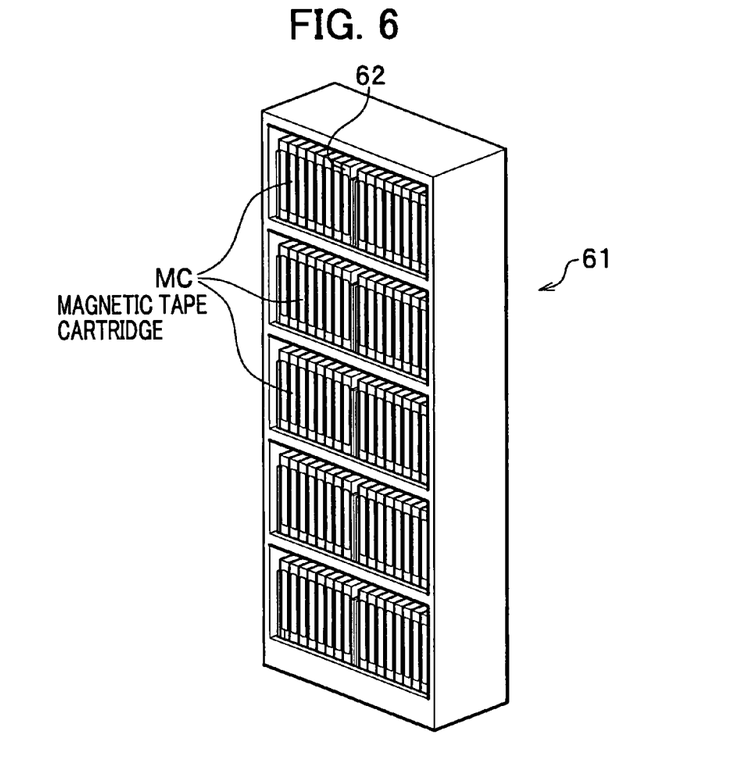
FIG. 6 is a schematic diagram showing a storage rack for the magnetic tape cartridges.

In companies, organizations, institutions, and so on which handle a large amount of data or very important data such as personal information which require security protection, the data are saved in a large capacity of recording medium so as to be backed up. Thus, it is possible to prevent loss of the data. A magnetic tape cartridge is used as the recording medium to back up the data due to its large storage capacity, reliability, and easy handling. Moreover, the magnetic tape cartridges which hold the back-up data are collectively stored under strict management in a controlled area such as a storage house or a storage room where human access is controlled. Thus, it is possible to restrict and control the magnetic tape cartridges being carried out so as to prevent loss of the important data. For instance, a cartridge storage rack 61 shown in FIG. 6 is placed in the controlled area where ID authentication with an ID card or the like is required to restrict people to enter freely. In addition, the magnetic tape cartridges MCs which hold the back-up data are stored in the cartridge storage rack 61. In this case, a label which shows a management number for identification, description of the saved back-up data, a back-up date, and so on is affixed on each of the magnetic tape cartridges MCs. Then, each of the magnetic tape cartridges MCs is stored in the cartridge storage rack 61 with a labeling side 62 facing outside so that the items shown on the label can be seen.

However, even in the controlled area where human access is controlled, it is necessary to monitor each of the magnetic tape cartridges MCs itself. By so doing, it is possible to restrict each of the magnetic tape cartridges MCs being carried out of the controlled area. Otherwise, a person who enters into the controlled area can easily carry out the magnetic tape cartridge MC from the controlled area.

In view of the above, to prevent the magnetic tape cartridge MC from being carried out of the controlled area, a security tag is affixed or attached on each of the magnetic tape cartridges MCs. This makes it possible to monitor the magnetic tape cartridges MCs not to be carried out of the controlled area freely. However, the security tag is conventionally put on an outside of the magnetic tape cartridge. Therefore, when the security tag is detached, a detector cannot detect the magnetic tape cartridge even though the detector is set in a doorway. As a result, it is possible to carry out the magnetic tape cartridge from the controlled area.

For this reason, a magnetic tape cartridge with a built-in security tag which is not easily detached is proposed (See JP 2004-127349A). However, the conventionally proposed security tags in the magnetic tape cartridges are described merely about how to install the security tags in the magnetic tape cartridges with consideration of shapes and so on of the magnetic tape cartridges. Therefore, the security tags are described without consideration of detection of the security tags, which is to be a principal object.

Figure 5A:
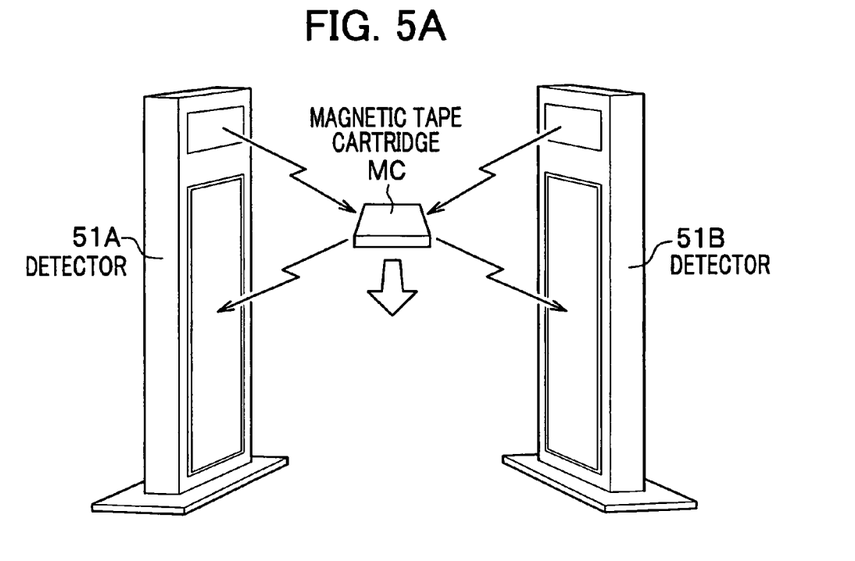
FIG. 5A is a schematic diagram showing a security gate which is placed in a doorway of a controlled area.
Figure 5B:
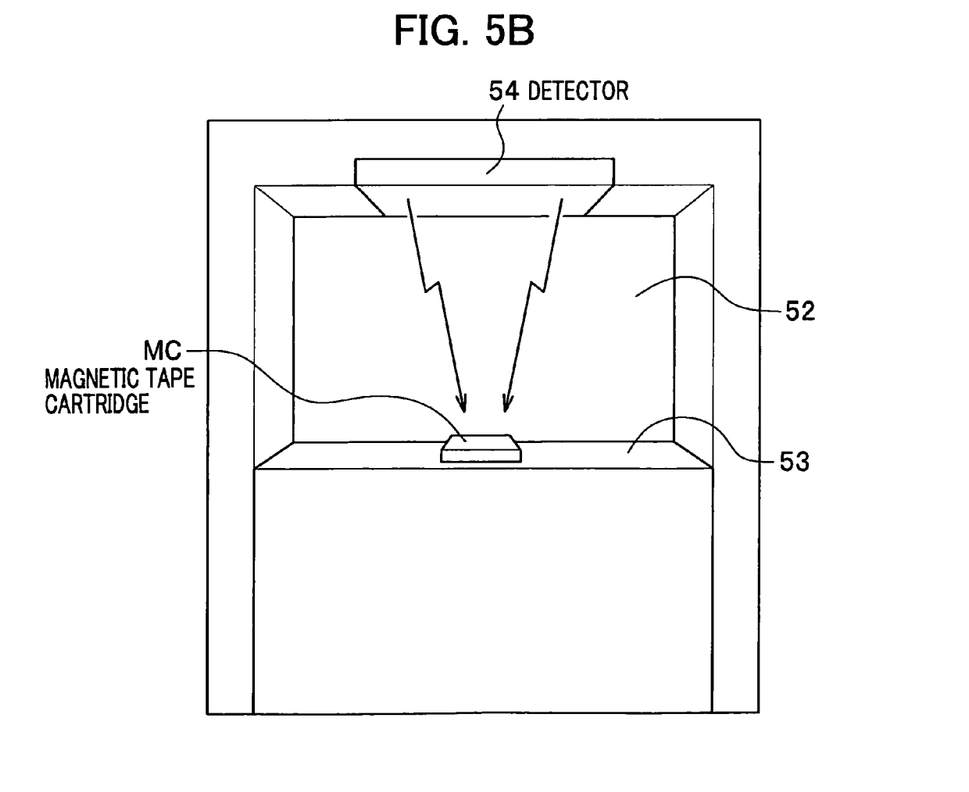
FIG. 5B is a schematic diagram showing a security gate which is placed in a service window.
Figure 7:
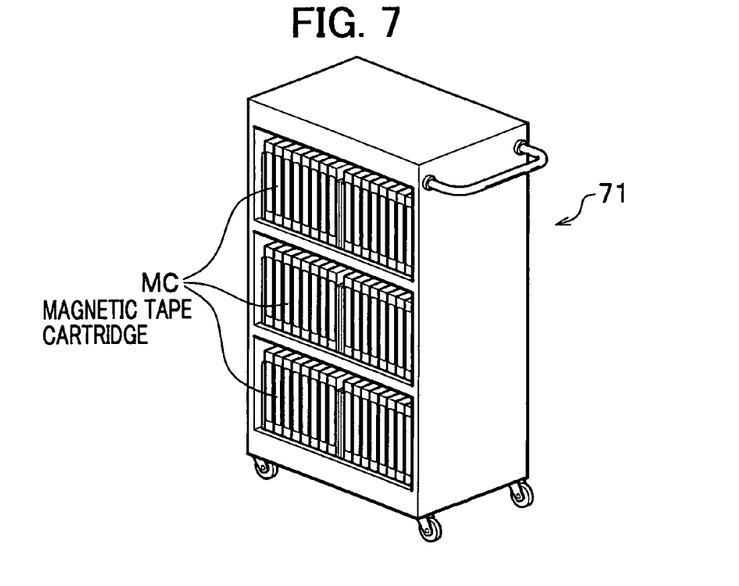
FIG. 7 is a schematic diagram showing an example of a carrier cart for the magnetic tape cartridges.

By the way, as shown in FIG. 7, when a large number of the magnetic tape cartridges are carried out of the controlled area, the magnetic tape cartridges MCs are loaded onto a carrier cart 71 and then carried out. Moreover, as shown in FIG. 5B, the magnetic tape cartridge MC may pass through a service window and then be carried out of the controlled area.

When the carrier cart where the large number of the magnetic tape cartridges are loaded, or the magnetic tape cartridge passes by a detector (through a security gate) placed in a doorway of the controlled area, it is detected whether the magnetic tape cartridge has the security tag or not. At this time, each of the magnetic tape cartridges is usually loaded onto the carrier cart with the labeling side facing outside so that the magnetic tape cartridge can be visually checked. And, the labeling side of the magnetic tape cartridge usually faces outside also when the magnetic tape cartridge passes through the service window. In addition, when the magnetic tape cartridge is stored or carried, the upper surface of the upper half of the magnetic tape cartridge faces a ceiling. Otherwise, when the magnetic tape cartridge erects, the labeling side is designed to face upward (in a case of one reel) or sideways (in such a way that a supply reel is placed lower than the other reel in a case of two reels). Therefore, the magnetic tape cartridges are not to be carried with the upper surfaces of the upper halves facing a floor even using methods other than the carrier cart.

However, in the magnetic tape cartridge described in JP 2004-127349A, it is merely described that the security tag is arranged at an opposite corner from a position where a write protect tag or a built-in tag to identify a type of the magnetic tape cartridge is placed, or the like. Therefore, no situation of the security gate or carrying out of the magnetic tape cartridges is considered. As a result, the detector may be impossible to detect the security tag since a detection signal from the detector or the like may be blocked depending on methods or ways to carry out the magnetic tape cartridge.

SUMMARY OF THE INVENTION

In view of the above, it is an object of the present invention to solve the above-mentioned problem and provide a magnetic tape cartridge whose built-in security tag can be detected in accordance with how a detector is actually placed and how the magnetic tape cartridge is carried.

To solve the problem, in one aspect of the present invention, there is provided a magnetic tape cartridge including a case which is formed by an upper half and a lower half which are combined together, a reel to which a magnetic tape is wound, being rotatably contained in the case, a labeling side which is provided in an outer surface of the case, and a security tag which an external detector can detect. In the magnetic tape cartridge, the security tag is arranged behind the labeling side so as to face obliquely upward.

In the magnetic tape cartridge, the security tag which the external detector can detect is arranged behind the outer surface of the case where the labeling side is provided. In addition, the security tag is arranged so as to face obliquely upward. As a result, the detector can more surely detect the security tag.

In addition, the magnetic tape cartridge may further include a reinforcing rib which protrudes inside the case to surround a periphery of the magnetic tape which is wound to the reel. In the magnetic tape cartridge, the security tag may be arranged along an outside wall of the reinforcing rib.

In the magnetic tape cartridge, the security tag is arranged along the outside wall of the reinforcing rib. And, the reinforcing rib protrudes inside the case to surround the periphery of the magnetic tape which is wound to the reel. Therefore, the external detector can more surely detect the security tag.

Moreover, in the magnetic tape cartridge, the security tag may include a transmitter-receiver which receives a detection signal sent from the detector within a predetermined detection range and transmits a response signal corresponding to the detection signal. In addition, the transmitter-receiver may be directed in the case so as to face an upper side of the upper half as well as the labeling side.

In the magnetic tape cartridge, the transmitter-receiver receives the detection signal sent from the detector in the predetermined detection range and sends the response signal corresponding to the detection signal. And, the transmitter-receiver is directed in the case so as to face the upper side of the upper half as well as the labeling side. Accordingly, the security tag can more surely receive the detection signal sent from the detector from a direction of the upper side of the upper half or the labeling side which opens outside.

In another aspect of the present invention, there is provided a magnetic tape cartridge including a case which is formed by an upper half and a lower half which are combined together, a first reel to which a magnetic tape is wound, being rotatably contained in the case, a second reel which takes up the magnetic tape sent from the first reel, being rotatably contained in the case, a first rib which protrudes from each of the upper half and the lower half along a periphery of the first reel inside the case, a second rib which protrudes from each of the upper half and the lower half along a periphery of the second reel inside the case, a security tag which an external detector can detect, and an installation rib which is formed in at least one of the first rib and the second rib which protrude from the lower case, in order to hold the security tag.

In the magnetic tape cartridge according to the present invention, the security tag may be held in the installation rib in such a manner that an upper surface of the security tag faces the upper half.

In addition, in the magnetic tape cartridge, the security tag may be held in the installation rib in such a manner that an upper surface of the security tag faces the upper half as well as a labeling side which is provided in a peripheral side of the case.

Moreover, in the magnetic tape cartridge, the security tag may be held in the installation rib in such a manner that a crossing angle between the upper surface of the security tag and a bottom surface of the installation rib is 45 degrees.

Furthermore, in the magnetic tape cartridge, the security tag may include, on an upper surface of the security tag, a transmitter-receiver which receives a detection signal sent from the external detector and transmits a response signal corresponding to the detection signal.

In a further aspect of the present invention, there is provided a magnetic tape cartridge including a case which is formed by an upper half and a lower half which are combined together, a reel to which a magnetic tape is wound, being rotatably contained in the case, a rib which protrudes from each of the upper half and the lower half along a periphery of the reel inside the case, a security tag which an external detector can detect, and an installation rib which is formed in the rib which protrudes from the lower case, in order to hold the security tag.

In the magnetic tape cartridge according to the present invention, the security tag may be held in the installation rib in such a manner that an upper surface of the security tag faces the upper half.

In addition, in the magnetic tape cartridge, the security tag may be held in the installation rib in such a manner that an upper surface of the security tag faces the upper half as well as a labeling side which is provided in a peripheral side of the case.

Moreover, in the magnetic tape cartridge, the security tag may be held in the installation rib in such a manner that a crossing angle between the upper surface of the security tag and a bottom surface of the installation rib is 45 degrees.

Furthermore, in the magnetic tape cartridge, the security tag may include, on the upper surface of the security tag, a transmitter-receiver which receives a detection signal sent from the external detector and transmits a response signal corresponding to the detection signal.

In the present invention, shape and structure of the security tag only needs to be suitable to be built in the magnetic tape cartridge and detected by the external detector. Therefore, there are no other special limitations on the security tag. For instance, examples of the security tags including a transmitter-receiver and a generator of signals are as the followings:

(1) A laminated resonator having a dielectric layer and a coil and a capacitor electrode which are formed of a metallic foil in a helical pattern and provided on one side or each of both sides of the dielectric layer; the dielectric layer, the coil, and the capacitor electrode form a resonance circuit having a resistance, an inductance, and an electrostatic capacity; thus, the laminated resonator resonates with a radio wave with a specific resonance frequency received from a detector.

(2) A film device having a dipole antenna to receive a radio wave with a specific frequency sent from a detector, a diode to multiply the frequency of the received radio wave to generate a radio wave with the multiplied frequency, and a loop antenna to transmit the radio wave with the multiplied frequency.

(3) A device having functions to receive a radio wave with a specific frequency sent from a detector and then transmit a response signal, as well as issue an alarm.

DESCRIPTION OF THE PREFERRED EMBODIMENTS

Here will be described in detail embodiments of the present invention, referring to the accompanying drawings as needed.

Figure 1:
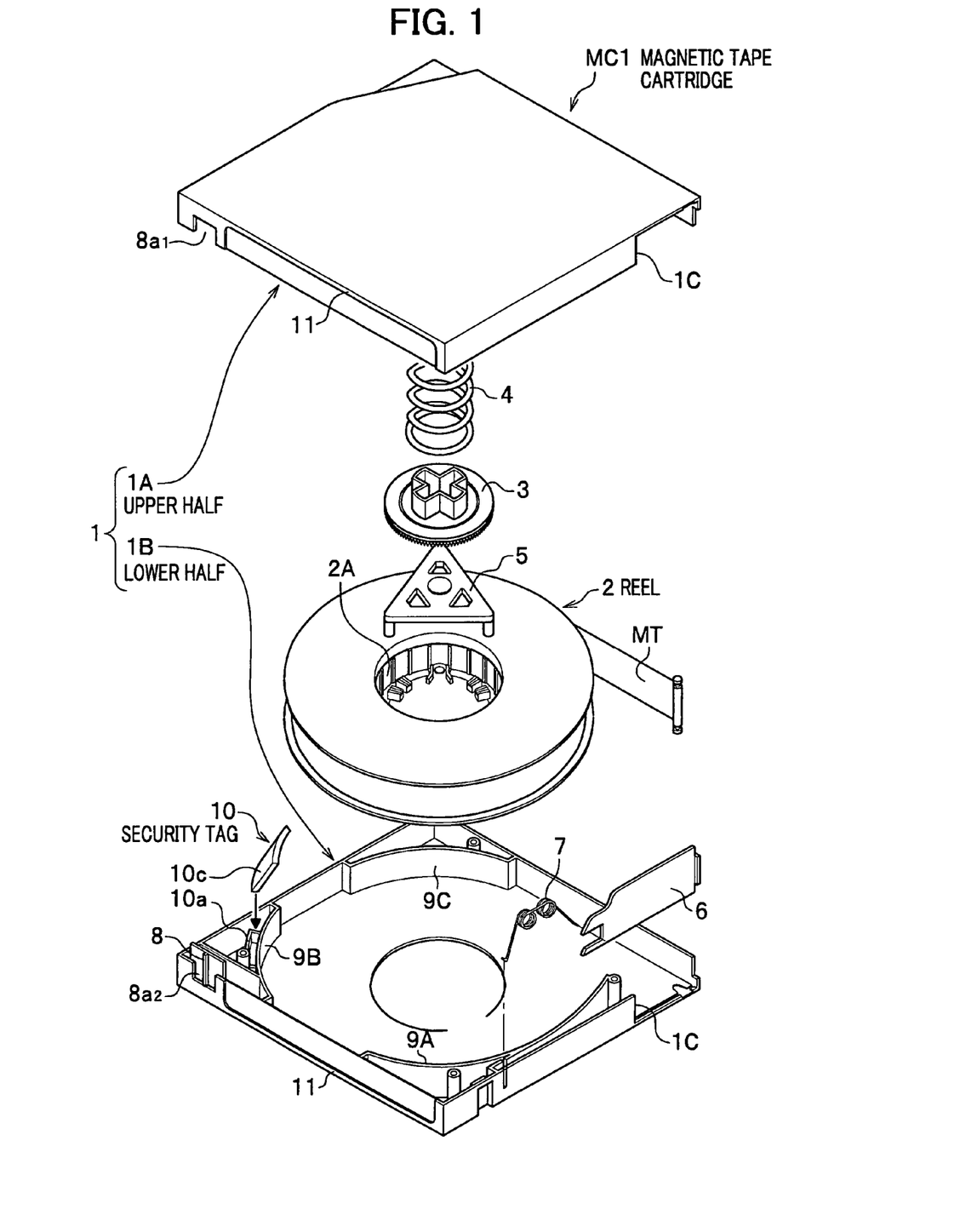
FIG. 1 is an exploded perspective view showing configuration of a magnetic tape cartridge according to the first embodiment of the present invention.

In the magnetic tape cartridge MC1 shown in FIG. 1, an upper half 1A and a lower half 1B are combined to form a case 1. Inside the case 1, the magnetic tape cartridge MC1 includes a single reel 2 to which a magnetic tape MT is wound, a reel lock 3 to lock rotation of the reel 2, a compressed coil spring 4, a release pad 5 to release the lock of the reel 2, a sliding door 6 to open and close a magnetic tape outlet 1C which is formed in the case 1 extending across the upper half 1A and the lower half 1B, a torsion coil spring 7 to urge the sliding door 6 to a close position of the magnetic tape outlet 1 C, a write protector 8, and so on. In addition, reinforcing ribs (ribs) 9A, 9B, and 9C protrude as necessary in the lower half 1B so as to surround a periphery of the reel 2. Moreover, reference characters 8a1 and 8a2 denote cuts to form a small window through which the write protector 8 is operated. The small window is formed when the upper half 1A and the lower half 1B are combined to form the case 1.

The reel 2 has a cup-shaped hub 2A, which opens toward an upper half 1A side, in the center. In addition, the release pad 5, the reel lock 3, and the compressed coil spring 4 are sequentially combined inside the cup-shaped hub 2A. When the magnetic tape cartridge MC1 is not used, the rotation of the reel 2 is locked. When the magnetic tape cartridge MC1 is used, the rotation lock of the reel 2 is released so that the reel 2 can rotate.

The magnetic tape cartridge MC1 is set in a proper tape drive (not shown). Thus, a rotation drive unit of the tape drive pushes the release pad 5. Then, the release pad 5 lifts the reel lock 3 toward the upper half 1A against pushing force of the compressed coil spring 4. Accordingly, the rotation lock of the reel 2 by means of the reel lock 3 is released. As a result, the rotation drive unit of the tape drive starts rotating the reel 2 while the reel 2 becomes able to rotate. At the same time, the sliding door 6 opens and the magnetic tape MT is drawn into the tape drive. Thus, the tape drive becomes ready to read and write data from and to the magnetic tape MT.

In the magnetic tape cartridge MC1, a labeling side 11 is provided in an outer surface (a peripheral side) of the case 1 where the write protector 8 is arranged. On the labeling side 11, a label which shows a management number for identification, description of saved back-up data, a back-up date, and so on is affixed. The labeling side 11 usually faces outside so as to be seen for visual check of the magnetic tape cartridge MC1 when the magnetic tape cartridge MC1 is loaded onto a carrier cart (See FIG. 7), when the magnetic tape cartridge MC1 is stored (See FIG. 6), and when the magnetic tape cartridge MC1 passes through a service window. Moreover, the magnetic tape cartridge MC1 is designed in such a way that the upper surface of the upper half of the magnetic tape cartridge faces a ceiling (See FIGS. 5A and 5B) or that when the magnetic tape cartridge erects, the labeling side 11 faces upward (in a case of one reel) or sideways (with a supply reel being placed lower than the other reel in a case of two reels).

Figure 2A:
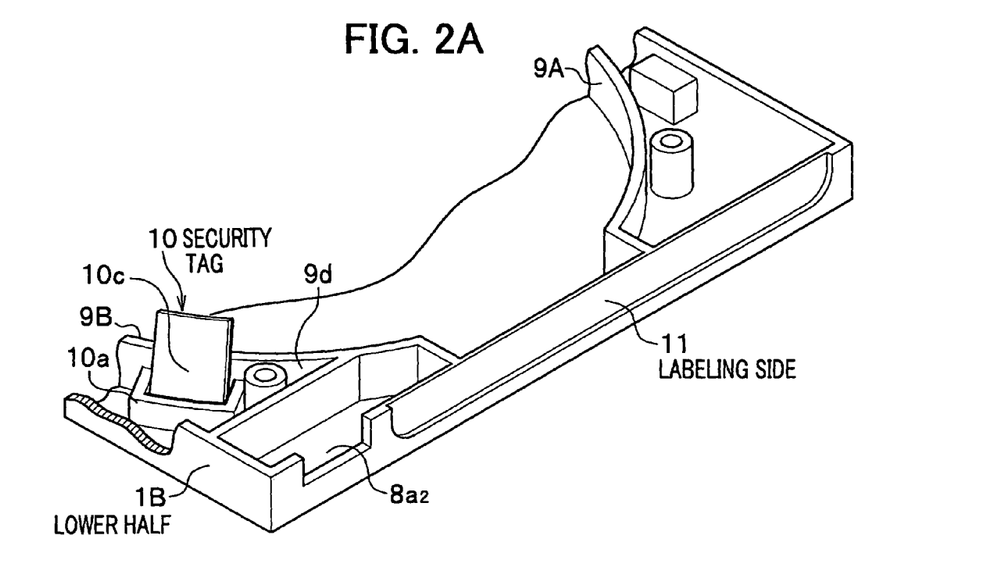
FIG. 2A is a partially cut-away perspective view of the magnetic tape cartridge according to the first embodiment.
Figure 2B:
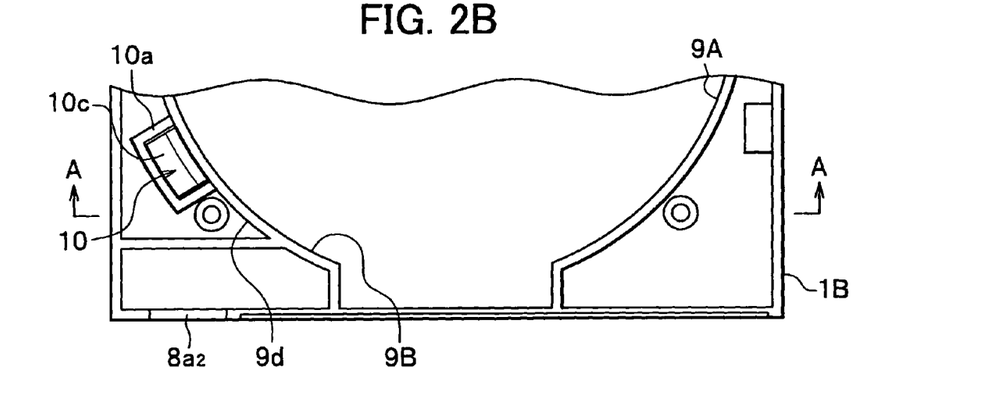
FIG. 2B is a horizontal sectional view of the magnetic tape cartridge according to the first embodiment.
Figure 2C:
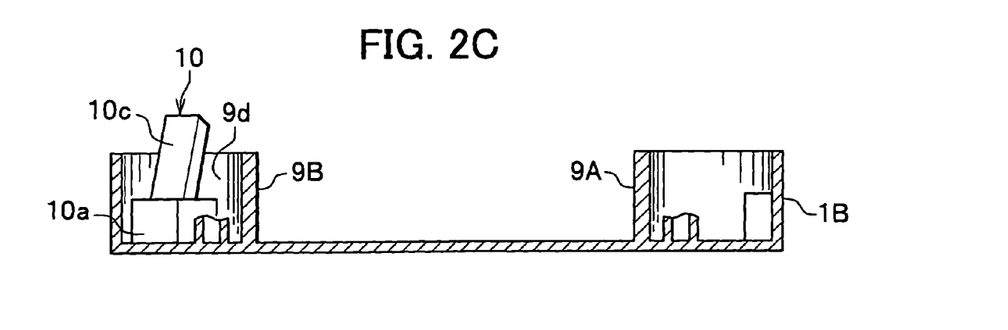
FIG. 2C is a cross-sectional view of FIG. 2B taken along arrows A-A.

In the magnetic tape cartridge MC1, a security tag 10 is installed in a tag installation rib (an installation rib) 10a which protrudes from an upper portion of an outside wall 9d of the reinforcing rib 9B behind the labeling side 11. In that way, the security tag 10 abuts along the outside wall 9d and tilts toward an upper inner surface of the upper half 1A so as to face obliquely upward. Moreover, the security tag 10 is arranged in the tag installation rib 10a in the case 1 in such a way that a transmitter-receiver of the security tag 10 is directed to face an upper side of the upper half 1A as well as the labeling side 11. Thus, the transmitter-receiver of the security tag 10 receives a detection signal sent from a detector within a predetermined detection range and transmits a response signal corresponding to the detection signal. In other words, as shown in FIGS. 2A-2C, the security tag 10 is arranged in such a way that the upper surface 10c of the security tag 10 is directed obliquely, usually by an angle of 45 degrees, with respect to a bottom surface of the tag installation rib 10a. Therefore, the upper surface 10c of the security tag 10 faces the upper inner surface of the upper half 1A as well as the labeling side 11.

Figure 3:
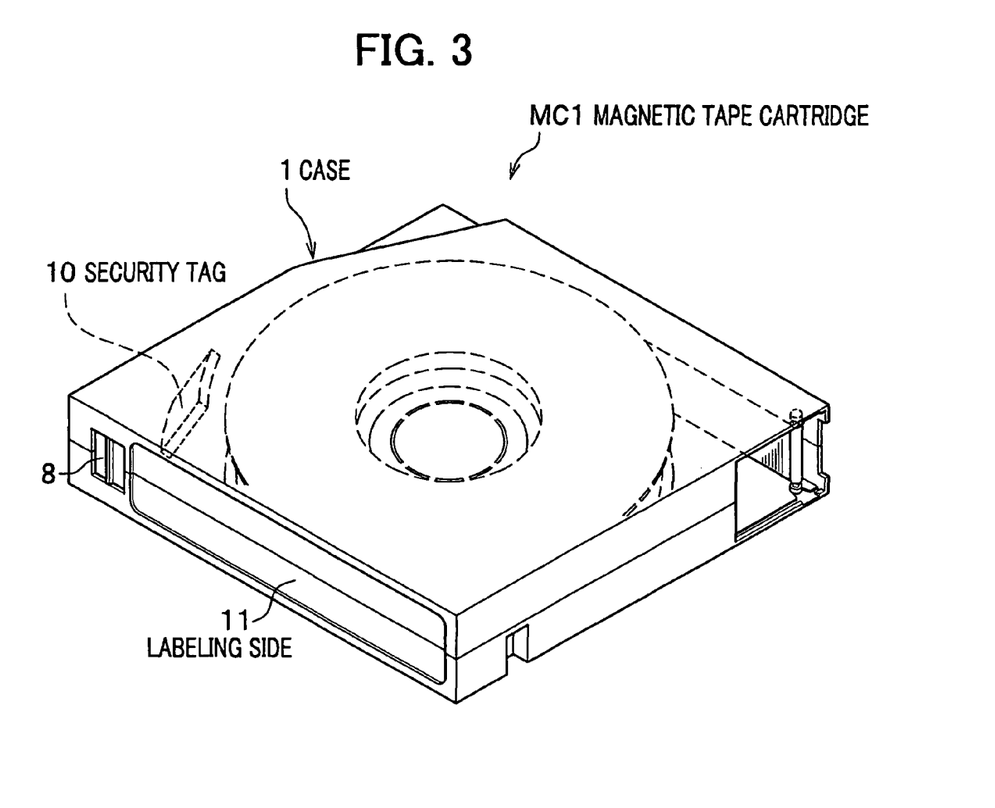
FIG. 3 is a partially cut-away perspective view of the magnetic tape cartridge according to the first embodiment.

As shown in FIG. 3, in the magnetic tape cartridge MC1, the upper surface 10c of the security tag 10 is directed to face the upper inner surface of the upper half 1A as well as the labeling side 11. Therefore, the security tag 10 surely receives a detection signal sent from an external detector and transmits a response signal corresponding to the detection signal. Thus, the detector can more surely detect the response signal so as to accomplish highly sensitive transmission and reception with no communication obstacle.

Figure 4:
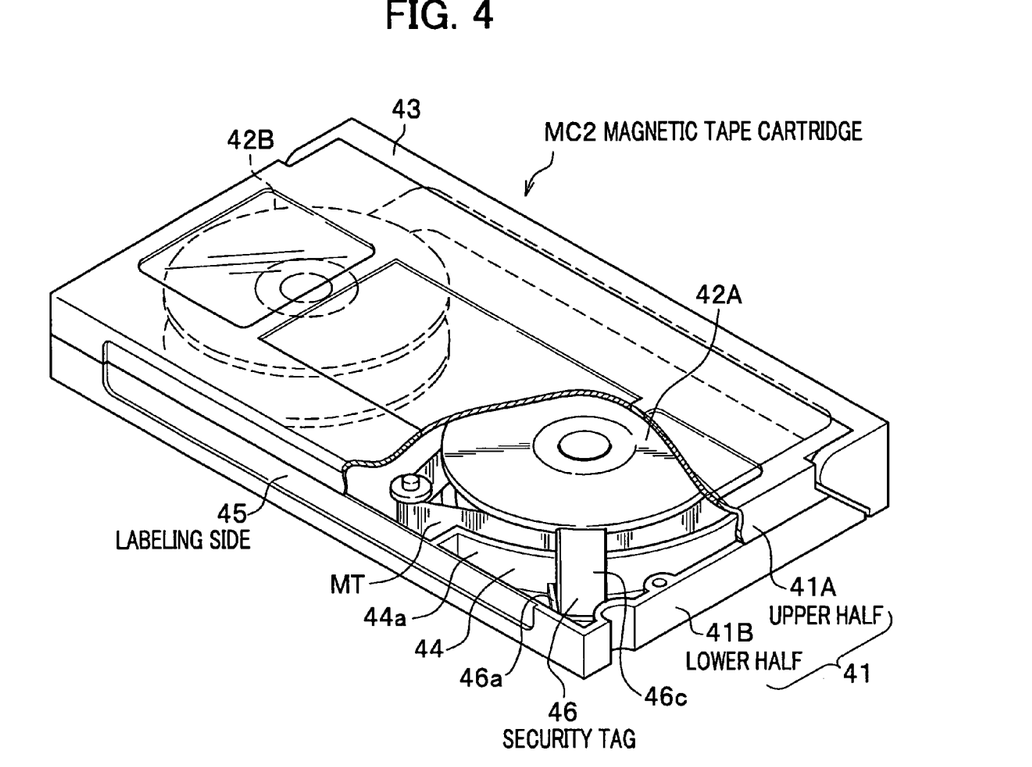
FIG. 4 is a partially cut-away perspective view of a magnetic tape cartridge according to the second embodiment.

FIG. 4 is a partially cut-away perspective view of a magnetic tape cartridge MC2 according to the second embodiment of the present invention.

As shown in FIG. 4, in the magnetic tape cartridge MC2, an upper half 41A and a lower half 41B are combined to form a case 41. In addition, a supply hub (a reel or a first reel) 42A to which a magnetic tape MT is wound and a take-up hub (a reel or a second reel) 42B are contained inside the case 41.

In a front side (in an upper right direction in FIG. 4) of the upper half 41 A, a front cover 43 is pivotally attached to the upper half 41A. The front cover 43 protects the magnetic tape MT which runs in front of the case 41 while the magnetic tape cartridge MC2 is not used. Moreover, a slider (not shown) to cover an opening (not shown) into which a driving unit of a tape reader/recorder (a tape drive) is to be inserted is attached in a lower surface of an outside of the lower half 41B so as to be able to slide back and forth.

In the magnetic tape cartridge MC2, a security tag 46 is installed in a tag installation rib (an installation rib) 46a which protrudes from an upper portion of an outside wall 44a of a reinforcing rib (a first rib, or a second rib which is not shown) 44. The reinforcing rib 44 protrudes inside the case 41 behind a labeling side 45 so as to surround a periphery of the magnetic tape MT which is wound to the supply hub 42A (or the take-up hub 42B). In that way, the security tag 46 abuts along the outside wall 44a and tilts toward an upper inner surface of the upper half 41A so as to face obliquely upward. Moreover, the security tag 46 is arranged in the tag installation rib 46a in the case 41 in such a way that a transmitter-receiver of the security tag 46 is directed to face an upper inner surface of the upper half 41A as well as the labeling side 45. Thus, the transmitter-receiver of the security tag 10 receives a detection signal sent from a detector within a predetermined detection range and transmits a response signal corresponding to the detection signal. In other words, the security tag 46 is arranged in such a way that the upper surface 46c of the security tag 46 is directed obliquely, usually by an angle of 45 degrees, with respect to a bottom surface of the tag installation rib 46a. Therefore, the upper surface 46c of the security tag 46 faces the upper inner surface of the upper half 41A as well as the labeling side 45.

In the magnetic tape cartridge MC2, the upper surface 46c of the security tag 46 is directed to face the upper inner surface of the upper half 41A as well as the labeling side 45. Therefore, the security tag 46 surely receives a detection signal sent from an external detector and transmits a response signal corresponding to the detection signal. Thus, the detector can more surely detect the response signal so as to accomplish highly sensitive transmission and reception with no communication obstacle.

By the way, each of the embodiments shows one of examples of magnetic tape cartridges according to the present invention. Therefore, it is needless to say that the present invention should not be limited to these. For instance, in the embodiments, description has been given to an example where the security tag 10 (46) is installed in the tag installation rib 10*a* (46*a*) which protrudes from the reinforcing rib 9B (44). However, the security tag 10 (46) does not need to be always installed in this position. For instance, the security tag 10 (46) may be installed on the inner surface of the upper half 1A (41A), or the like. Moreover, methods to install the security tag 10 (46) are not especially limited either. The security tag 10 (46) may be installed by any of installation methods using adhesive, double-faced tape, screws, and so on.

In addition, in the first embodiment, description has been given to an example where the security tag 10 is installed to the reinforcing rib 9B behind the write protector 8. However, the security tag 10 may be arranged on the outside wall of the reinforcing rib 9A. In this case, the security tag 10 may be also installed by any of installation methods using a tag installation rib 10*a*, adhesive, double-faced tape, screws, and so on.

For a magnetic tape cartridge of the present invention, any type of detectors which can detect a security tag built in the magnetic tape cartridge may be employed. For instance, as shown in FIG. 5A, two detectors 51A and 51B which transmit detection signals may be placed to face each other. In this way, a carrier cart, a person who carries out the magnetic tape cartridge, or the like may pass through between the detectors. Moreover, as shown in FIG. 5B, a detector 54 which transmits a detection signal may be placed in an upper portion of a service window 52. Furthermore, any types of detectors such as a detector with a loop antenna may be employed.

Concerning the detectors 51A and 51B shown in FIG. 5A, when a magnetic tape cartridge MC passes through between the detectors 51A and 51B, a security tag built in the magnetic tape cartridge MC receives a detection signal sent from the two detectors 51A and 51B and transmits a response signal. Then, the detectors detect the response signal to detect the magnetic tape cartridge MC being carried out of the controlled area.

In addition, concerning the detector 54 shown in FIG. 5B, when a magnetic tape cartridge MC is put on the service counter 53 of the service window 52, the security tag built in the magnetic tape cartridge MC receives a detection signal sent from the detector 54 and transmits a response signal. Then, the detector detects the response signal to detect the magnetic tape cartridge MC being carried out of the controlled area.

At this time, why to carry out the magnetic tape cartridge MC, how to use the magnetic tape cartridge MC, and who to use the magnetic tape cartridge MC is checked. Then, if the magnetic tape cartridge MC is authorized to be carried out, transmit and receive functions of the security tag built in the magnetic tape cartridge MC are cancelled in advance. Thus, it is possible to detect only magnetic tape cartridges which are not authorized to be carried out. Therefore, each of the magnetic tape cartridges itself is monitored. As a result, it is possible to restrict the magnetic tape cartridges being carried out of the controlled area. Moreover, it is possible to prevent a person who enters into the controlled area from carrying out the magnetic tape cartridge from the controlled area without permission.

In these cases, concerning a magnetic tape cartridge according to the present invention, a security tag is directed in a case in such a way that a transmitter-receiver of the security tag faces an upper side of an upper half as well as a labeling side. Thus, the transmitter-receiver receives a detection signal sent from a detector within a predetermined detection range and transmits a response signal corresponding to the detection signal. Therefore, it is possible to detect the security tag built in the magnetic tape cartridge in accordance with how the detector is actually installed and how the magnetic tape cartridge is carried.

In a magnetic tape cartridge according to the present invention, a security tag which an external detector can detect is arranged behind an outer surface of a case where a labeling side is provided. In addition, the security tag is arranged so as to tilt toward an upper inner surface of an upper half to face obliquely upward. Accordingly, it is possible to detect the security tag built in the magnetic tape cartridge in accordance with how to actually install the detector and how to carry the magnetic tape cartridge.

While the described embodiments represent the preferred forms of the present invention, it is to be distinctly understood that the invention is not limited thereto but may be otherwise variously embodied within the spirit and scope of the following claims.

What is claimed is:

1. A magnetic tape cartridge comprising:
a case which is formed by an upper half and a lower half which are combined together;
a first reel to which a magnetic tape is wound, being rotatably contained in the case;
a second reel which takes up the magnetic tape sent from the first reel, being rotatably contained in the case;
a first rib which protrudes from each of the upper half and the lower half along a periphery of the first reel inside the case;
a second rib which protrudes from each of the upper half and the lower half along a periphery of the second reel inside the case;
a security tag which an external detector can detect; and
an installation rib which is formed in at least one of the first rib and the second rib which protrude from the lower case, in order to hold the security tag,
wherein the security tag is disposed on and separately from an inner surface of the lower half, and a center of the security tag is position in the upper half.

2. A magnetic tape cartridge as claimed in claim 1, wherein the security tag is held in the installation rib in such a manner that an upper surface of the security tag faces the upper half.

3. A magnetic tape cartridge as claimed in claim 1, wherein the security tag is held in the installation rib in such a manner that an upper surface of the security tag faces the upper half as well as a labeling side which is provided in a peripheral side of the case.

4. A magnetic tape cartridge as claimed in claim 2, wherein the security tag is held in the installation rib in such a manner that a crossing angle between the upper surface of the security tag and a bottom surface of the installation rib is 45 degrees.

5. A magnetic tape cartridge as claimed in claim 3, wherein the security tag is held in the installation rib in such a manner that a crossing angle between the upper surface of the security tag and a bottom surface of the installation rib is 45 degrees.

6. A magnetic tape cartridge as claimed in claim 1, wherein the security tag comprises on an upper surface thereof a transmitter-receiver which receives a detection signal sent from the external detector and transmits a response signal corresponding to the detection signal.

7. A magnetic tape cartridge as claimed in claim 2, wherein the security tag comprises on an upper surface thereof a transmitter-receiver which receives a detection signal sent from the external detector and transmits a response signal corresponding to the detection signal.

8. A magnetic tape cartridge as claimed in claim 3, wherein the security tag comprises on the upper surface thereof a transmitter-receiver which receives a detection signal sent from the external detector and transmits a response signal corresponding to the detection signal.

9. A magnetic tape cartridge as claimed in claim 4, wherein the security tag comprises on the upper surface thereof a transmitter-receiver which receives a detection signal sent from the external detector and transmits a response signal corresponding to the detection signal.

10. A magnetic tape cartridge as claimed in claim 5, wherein
the security tag comprises on an upper surface thereof a transmitter-receiver which receives a detection signal sent from the external detector and transmits a response signal corresponding to the detection signal.

11. A magnetic tape cartridge comprising:
a case which is formed by an upper half and a lower half which are combined together;
a reel to which a magnetic tape is wound, being rotatably contained in the case;
a plurality of ribs which protrude from the upper half and the lower half respectively along a periphery of the reel inside the case;
a security tag which an external detector can detect; and
an installation rib which is formed in the rib which protrudes from the lower case, in order to hold the security tag,
wherein the security tag is disposed separately from an inner surface of the lower half, and a center of the security tag is positioned in the upper half.

12. A magnetic tape cartridge as claimed in claim 11, wherein
the security tag is held in the installation rib in such a manner that an upper surface of the security tag faces the upper half.

13. A magnetic tape cartridge as claimed in claim 11, wherein
the security tag is held in the installation rib in such a manner that an upper surface of the security tag faces the upper half as well as a labeling side which is provided in a peripheral side of the case.

14. A magnetic tape cartridge as claimed in claim 13, wherein
the security tag is held in the installation rib in such a manner that a crossing angle between the upper surface of the security tag and a bottom surface of the installation rib is 45 degrees.

15. A magnetic tape cartridge as claimed in claim 12, wherein
the security tag comprises on the upper surface thereof a transmitter-receiver which receives a detection signal sent from the external detector and transmits a response signal corresponding to the detection signal.

16. A magnetic tape cartridge as claimed in claim 14, wherein
the security tag comprises on the upper surface thereof a transmitter-receiver which receives a detection signal sent from the external detector and transmits a response signal corresponding to the detection signal.

17. A magnetic tape cartridge as claimed in claim 1, wherein the installation rib is disposed along an outside wall of one of the first rib and the second rib.

18. A magnetic tape cartridge as claimed in claim 11, wherein the installation rib is disposed along an outside wall of the rib protruding from the lower half.

* * * * *